United States Patent
Yangel et al.

(10) Patent No.: US 11,740,358 B2
(45) Date of Patent: Aug. 29, 2023

(54) METHODS AND SYSTEMS FOR COMPUTER-BASED DETERMINING OF PRESENCE OF OBJECTS

(71) Applicant: YANDEX SELF DRIVING GROUP LLC, Skolkovo (RU)

(72) Inventors: Boris Konstantinovich Yangel, Nalchik (RU); Maksim Ilich Stebelev, Khimki (RU)

(73) Assignee: YANDEX SELF DRIVING GROUP LLC, Moscow (RU)

( * ) Notice: Subject to any disclaimer, the term of this patent is extended or adjusted under 35 U.S.C. 154(b) by 548 days.

(21) Appl. No.: 16/929,775

(22) Filed: Jul. 15, 2020

(65) Prior Publication Data
US 2021/0157002 A1  May 27, 2021

(30) Foreign Application Priority Data
Nov. 21, 2019 (RU) ................. 2019137521

(51) Int. Cl.
*G01S 17/86* (2020.01)
*G06N 20/00* (2019.01)
(Continued)

(52) U.S. Cl.
CPC ............. *G01S 17/86* (2020.01); *B60W 40/00* (2013.01); *G01S 17/89* (2013.01); *G01S 17/931* (2020.01);
(Continued)

(58) Field of Classification Search
CPC ...... G01S 17/931; G01S 17/89; G01S 13/931; G01S 17/86; G01S 7/417; G01S 7/4802;
(Continued)

(56) References Cited

U.S. PATENT DOCUMENTS

| 9,058,247 B2 | 6/2015 | Fukamachi et al. |
| 9,435,887 B2 * | 9/2016 | Kim ........................ G01S 17/86 |

(Continued)

FOREIGN PATENT DOCUMENTS

| CN | 108020825 A * | 5/2018 | ............ G01S 17/86 |
| CN | 109633687 A | 4/2019 | |

(Continued)

OTHER PUBLICATIONS

European Search Report issued in European patent application 20184659 dated Dec. 17, 2020.
(Continued)

*Primary Examiner* — Michael P Stafira
(74) *Attorney, Agent, or Firm* — BCF LLP

(57) ABSTRACT

A method of and system for processing Light Detection and Ranging (LIDAR) point cloud data. The method is executable by an electronic device, communicatively coupled to a LIDAR installed on a vehicle, the LIDAR having a plurality of lasers for capturing LIDAR point cloud data. The method includes receiving a first LIDAR point cloud data captured by the LIDAR; executing a Machine Learning Algorithm (MLA) for: analyzing a first plurality of LIDAR points of the first point cloud data in relation to a response pattern of the plurality of lasers; retrieving a grid representation data of a surrounding area of the vehicle; determining if the first plurality of LIDAR points is associated with a blind spot, the blind spot preventing a detection algorithm of the electronic device to detect presence of at least one object surrounding the vehicle conditioned on the at least one object is present.

19 Claims, 8 Drawing Sheets

(51) Int. Cl.

| | | |
|---|---|---|
| *G01S 17/931* | (2020.01) | |
| *B60W 40/00* | (2006.01) | |
| *G01S 17/89* | (2020.01) | |
| *G06T 7/00* | (2017.01) | |
| *G06T 7/20* | (2017.01) | |
| *G06F 18/214* | (2023.01) | |

(52) U.S. Cl.
CPC ........... *G06F 18/214* (2023.01); *G06N 20/00* (2019.01); *G06T 7/0002* (2013.01); *G06T 7/20* (2013.01); *B60W 2420/42* (2013.01); *B60W 2420/52* (2013.01); *G06T 2207/20081* (2013.01); *G06T 2207/30261* (2013.01)

(58) Field of Classification Search
CPC ...... G01S 13/865; G01S 17/42; G01S 15/931; G01S 13/89; G01S 7/4817; G01S 13/867; G01S 2013/9323; G01S 7/4808; G01S 7/484; G01S 17/894; G01S 7/4865; G01S 2013/93271; G01S 13/86; G01S 17/10; G01S 17/36; G01S 7/4811; G01S 7/497; G01S 13/862; G01S 7/003; G01S 7/412; G01S 2013/93272; G01S 7/4816; G01S 17/04; G01S 2013/9315; G01S 7/40; G01S 7/4813; G01S 7/4972; G01S 13/87; G01S 15/86; G01S 17/87; G01S 2013/9324; G01S 7/4815; G01S 7/4863; G01S 17/88; G01S 2013/9316; G01S 2013/93274; G01S 7/52004; G01S 13/5242; G01S 17/93; G01S 2013/9318; G01S 13/723; G01S 15/872; G01S 17/875; G01S 19/41; G01S 7/414; G01S 13/06; G01S 13/582; G01S 15/66; G01S 15/87; G01S 17/66; G01S 19/45; G01S 2015/938; G01S 7/2955; G01S 7/4914; G01S 7/539; G01S 19/43; G01S 19/48; G01S 2015/937; G01S 7/4017; G01S 7/4026; G01S 7/4082; G01S 7/4086; G01S 7/4814; G01S 7/4818; G01S 7/51; G01S 13/584; G01S 13/876; G01S 13/90; G01S 17/48; G01S 19/42; G01S 2013/932; G01S 7/28; G01S 7/415; G01S 7/4804; G01S 7/481; G01S 13/345; G01S 13/42; G01S 13/88; G01S 15/8993; G01S 15/8997; G01S 17/46; G01S 17/90; G01S 2013/9317; G01S 2013/9322; G01S 3/80; G01S 5/0252; G01S 5/02528; G01S 7/03; G01S 7/032; G01S 7/282; G01S 7/35; G01S 7/356; G01S 13/933; G01S 17/34; G01S 17/58; G01S 17/933; G01S 19/23; G06N 3/045; G06N 3/08; G06N 3/063; G06N 3/084; G06N 20/00; G06N 3/04; G06N 3/044; G06N 3/088; G06N 3/047; G06N 3/048; G06N 5/04; G06N 7/01; G06N 3/049; G06N 3/02; G06N 3/006; G06N 3/082; G06N 5/01; G06N 20/10; G06N 20/20; G06N 3/105; G06N 5/046; G06N 3/042; G06N 5/022; G06N 3/008; G06N 3/061; G06N 3/086; G06N 3/10; G06N 3/0418; G06N 3/06; G06N 3/065; G06N 5/041; G06N 5/02; G06N 5/047; G06N 10/20; G06N 3/0464; G06N 3/0495; G06N 5/045; G06N 3/126; G06N 5/025; G06T 2207/20084; G06T 2207/20081; G06T 2207/30252; G06T 2207/10028; G06T 2207/30261; G06T 7/70; G06T 7/73; G06T 1/20; G06T 7/20; G06T 2207/10024; G06T 7/11; G06T 2210/12; G06T 7/0012; G06T 2207/10021; G06T 11/00; G06T 7/10; G06T 11/20; G06T 7/60; G06T 2207/20132; G06T 2207/10016; G06T 2207/30201; G06T 2207/30256; G06T 7/55; G06T 7/75; G06T 2207/30241; G06T 7/50; G06T 7/0002; G06T 11/60; G06T 2207/30244; G06T 5/002; G06T 7/12; G06T 2207/30196; G06T 9/002; G06T 7/00; G06T 7/33; G06T 7/593; G06T 5/50; G06T 17/00; G06T 2207/10081; G06T 2207/20076; G06T 2207/20221; G06T 3/4046; G06T 7/521; G06T 2207/20208; G06T 7/40; G06T 7/74; G06T 17/05; G06T 3/4038; G06T 7/246; G06T 2200/28; G06T 7/344; G06T 15/00; G06T 15/06; G06T 2207/10012; G06T 2207/10048; G06T 2207/10088; G06T 7/194; G06T 7/248; G06T 17/30; G06T 19/006; G06T 2200/04; G06T 2207/30004; G06T 5/009; G06T 7/62; G06T 7/90; G06T 2207/20072; G06T 2207/30168; G06T 7/0004; G06T 7/13; G06T 7/251; G06T 7/536; G06T 11/001; G06T 2207/10044; G06T 2207/20164; G06T 2207/20212; G06T 2207/30236; G06T 5/005; G06T 7/292; G06T 7/32; G06T 2207/30264; G06T 2207/30268; G06T 7/30; G06T 2207/10004; G06T 2207/20152; G06T 3/40; G06T 7/80; G06T 1/60; G06T 15/005; G06T 17/20; G06T 2200/08; G06T 2200/24; G06T 2207/10116; G06T 2207/20056; G06T 2219/2016; G06T 7/174; G06T 7/215; G06T 7/77; G06T 13/20; G06T 13/40; G06T 15/04; G06T 15/503; G06T 15/80; G06T 2207/10144; G06T 2207/20016; G06T 2207/30061; G06T 2210/28; G06T 3/0068; G06T 3/4053; G06T 3/4084; G06T 5/001; G06T 5/007; G06T 5/30; G06T 7/223; G06T 7/277; G06T 7/579; G06T 1/00; G06T 1/0014; G06T 11/003; G06T 13/00; G06T 15/20; G06T 17/10; G06T 19/00; G06T 19/003; G06T 19/20; G06T 2207/10052; G06T 2207/20004; G06T 2207/20024; G06T 2207/30016; G06T 2207/30048; G06T 2207/30081; G06T 2207/30184; G06T 2207/30188; G06T 2207/30248; G06T 2211/40; G06T 5/00; G06T 5/006; G06T 5/20; G06T 7/001; G06T 7/0014; G06T 7/285; G06T 7/35; G06T 7/529; G06T 7/97; G06T 9/008; G06T 11/40; G06T 15/10; G06T 15/506; G06T 17/205; G06T 2200/32; G06T 2207/10132; G06T 2207/20182; G06T 2207/30041; G06T 2210/21; G06T 2219/004; G06T 2219/2012; G06T 3/0006; G06T 3/0012; G06T 3/60; G06T 7/136; G06T 7/269; G06T 15/08; G06T 2207/20228; G06T 2207/30128; G06T 3/0031; G06T 3/0093; G06T 7/85; G06T 2207/10064; G06T 2207/10072; G06T 2207/10076; G06T 2207/10104; G06T 2207/10108; G06T 7/37; G06T 2207/30204; G06T 1/0007; G06T 2210/36; G06T 2210/41; G06T 2219/2004; G06T 9/00; G06T 9/001; G06T 9/40; G06T 13/80; G06T 2207/10032; G06T 2207/20101; G06T 2210/56; G06T 2219/2021; G06T 9/004; G06T 9/005; B60W 60/001; B60W 2420/42; B60W 60/0011; B60W 30/09; B60W 2420/52; B60W 60/0015; B60W 60/0027; B60W 30/0956; B60W 50/14; B60W 2552/53; B60W 2556/40; B60W 30/08; B60W 2554/80; B60W 50/00; B60W 2520/06; B60W 40/00; B60W 30/095; B60W 40/02; B60W 40/08; B60W 2050/0088; B60W 2050/146; B60W 2554/4041; B60W 2556/45; B60W 30/18154; B60W 2050/0018; B60W 2556/50; B60W 50/0097; B60W 60/00; B60W 60/0016; B60W 10/04; B60W 2050/143; B60W 2520/10; B60W 2540/223; B60W 2540/229; B60W 2554/4029; B60W 40/09; B60W 10/20; B60W 2040/0818; B60W 2050/0028; B60W 2050/0215; B60W 2420/403; B60W 2554/00; B60W 2554/40; B60W 30/00; B60W 40/04; B60W 60/00272; B60W 2050/0083; B60W 2420/54; B60W 2540/225; B60W 2554/4044; B60W 30/12; B60W 50/04; B60W 50/06; B60W 2040/0872; B60W 2050/0005; B60W 2400/00; B60W 2520/14; B60W 2520/16; B60W 2520/18; B60W 2540/221; B60W 2555/20; B60W 2556/35; B60W 30/143; B60W 30/18159; B60W 30/18163; B60W 50/02; B60W 50/045; B60W 60/00274; B60W 60/00276; B60W 2050/0062; B60W 2540/22; B60W 2554/404; B60W 2554/4042; B60W 2720/103; B60W 30/06; B60W 30/14; B60W 50/0205; B60W 60/005; B60W 10/18; B60W 2050/0014; B60W 2050/0043; B60W 2520/105; B60W 2540/00; B60W 2554/402; B60W 2554/4046; B60W 2554/804; B60W 2710/20; B60W 2720/106; B60W 40/105; B60W 50/0098; B60W 2050/021; B60W 2050/0292; B60W 2420/40; B60W 2554/4043; B60W 2554/801; B60W 2554/802; B60W 2720/125; B60W 40/10; B60W 50/023; B60W 50/029; B60W 60/0018; B60W 60/00186; B60W 10/06; B60W 2050/0004; B60W 2050/0006; B60W 2050/0012; B60W 2050/0025; B60W 2050/0026; B60W 2050/0031; B60W 2050/0033; B60W 2050/005; B60W 2050/0052; B60W 2300/125; B60W 2300/126; B60W 2300/145; B60W 2420/00; B60W 2540/26; B60W 2540/30; B60W 2552/00; B60W 2552/30; B60W 2554/20; B60W 2554/4026; B60W 2554/806; B60W 2556/20; B60W 2556/65; B60W 2710/0605; B60W 2710/18; B60W 30/0953; B60W 30/18; B60W 50/08; B60W 60/0013; B60W 60/0025; B60W 2720/10; B60W 2720/24; G06F 3/04847; G06F 18/2431; G06F 3/1423; G06F 3/167; G06F 18/214; G06F 11/3006; G06F 11/3409; G06F 11/3438; G06F 17/18; G06F 18/2178; G06F 18/24; G06F 18/253; G06F 2203/012; G06F 2203/04806; G06F 2203/04808; G06F 2209/509; G06F 3/011; G06F 3/013; G06F 3/017; G06F 3/0304; G06F 3/04845; G06F 3/04883; G06F 9/5016; G06F 9/5038; G06F 9/5066

See application file for complete search history.

(56) References Cited

U.S. PATENT DOCUMENTS

| | | | |
|---|---|---|---|
| 9,688,272 B2 | 6/2017 | Shiraishi et al. | |
| 9,785,828 B2 | 10/2017 | Ayvaci et al. | |
| 9,805,274 B2 | 10/2017 | Ayvaci et al. | |
| 9,910,442 B2 | 3/2018 | Kamata et al. | |
| 10,037,036 B2 | 7/2018 | Nilsson et al. | |
| 10,055,652 B2 | 8/2018 | Myers et al. | |
| 10,078,335 B2 | 9/2018 | Mei et al. | |
| 10,137,890 B2 | 11/2018 | Sakai et al. | |
| 10,262,215 B2 | 4/2019 | Yoshihira et al. | |
| 10,269,141 B1* | 4/2019 | Shotan | H04N 25/61 |
| 2002/0005778 A1 | 1/2002 | Breed et al. | |
| 2004/0016870 A1 | 1/2004 | Pawlicki et al. | |
| 2007/0139523 A1 | 2/2007 | Nishida et al. | |
| 2007/0188347 A1 | 8/2007 | Schofield | |
| 2010/0315215 A1 | 12/2010 | Yuda | |
| 2015/0286893 A1* | 10/2015 | Straub | G06V 10/243 |
| | | | 382/154 |
| 2016/0179093 A1 | 6/2016 | Prokhorov | |
| 2018/0050640 A1 | 2/2018 | Baur et al. | |
| 2019/0011913 A1* | 1/2019 | Chu | G05D 1/0246 |
| 2019/0025433 A1 | 1/2019 | Yang et al. | |
| 2019/0138823 A1 | 5/2019 | Doria et al. | |
| 2019/0204423 A1* | 7/2019 | O'Keeffe | G01S 17/89 |
| 2019/0250622 A1* | 8/2019 | Nister | B60W 60/0027 |
| 2019/0272433 A1 | 9/2019 | Yu et al. | |
| 2020/0090322 A1* | 3/2020 | Seo | G06V 10/993 |
| 2020/0094822 A1* | 3/2020 | Hardy | G06V 20/58 |
| 2021/0027629 A1* | 1/2021 | Tao | G05D 1/0088 |
| 2021/0073692 A1* | 3/2021 | Saha | G06Q 10/20 |
| 2021/0108926 A1* | 4/2021 | Tran | G06N 3/045 |
| 2021/0133990 A1* | 5/2021 | Eckart | G06F 18/2321 |
| 2021/0142160 A1* | 5/2021 | Mohseni | G06N 3/048 |

FOREIGN PATENT DOCUMENTS

| | | | | |
|---|---|---|---|---|
| CN | 104517281 B * | 8/2019 | | B60W 30/16 |
| DE | 102016122981 A1 | 5/2018 | | |
| WO | WO-2012091807 A2 * | 7/2012 | | B25J 19/02 |
| WO | WO-2019163315 A1 * | 8/2019 | | |
| WO | WO-2019191235 A1 * | 10/2019 | | G06K 7/10722 |

OTHER PUBLICATIONS

Russian Search report dated Jan. 26, 2021 in respect of the counterpart Russian Patent Application RU 2019137521.

\* cited by examiner

METHODS AND SYSTEMS FOR COMPUTER-BASED DETERMINING OF PRESENCE OF OBJECTS

CROSS-REFERENCE

The present application claims priority to Russian Patent Application No. 2019137521, entitled "Methods and Systems for Computer-Based Determining of Presence of Objects", filed on Nov. 21, 2019, the entirety of which is incorporated by reference herein.

FIELD OF TECHNOLOGY

The present technology relates to computer-implemented methods and systems for determining presence of an object, more specifically, to methods and systems for determining the presence of objects around a self driving car (SDC).

BACKGROUND

Several computer-based navigation systems that are configured for aiding navigation and/or control of vehicle have been proposed and implemented in the prior art. These systems range from more basic map-aided localization-based solutions—i.e. use of a computer system to assist a driver in navigating a route from a starting point to a destination point; to more complex ones—computer-assisted and/or driver-autonomous driving systems.

Some of these systems are implemented as what is commonly known as a "cruise control" system. Within these systems, the computer system boarded on the vehicles maintains a user-set speed of the vehicle. Some of the cruise control system implement an "intelligent distance control" system, whereby the user can set up a distance to a potential car in front (such as, select a value expressed in a number of vehicles) and the computer system adjusts the speed of the vehicle at least in part based on the vehicle approaching the potential vehicle in front within the pre-defined distance. Some of the cruise control systems are further equipped with collision control system, which systems upon detection of the vehicle (or other obstacle) in front of the moving vehicle, slow down or stop the vehicle.

Some of the more advanced system provide for a fully autonomous driving of the vehicle without direct control from the operator (i.e. the driver). These autonomously vehicles include computer systems that can cause the vehicle to accelerate, brake, stop, change lane and self-park.

One of the main technical challenges in implementing the above computer systems is the ability for the computer system to detect an object present around the vehicle—such as the vehicle in front of the present vehicle (the present vehicle having the computer system onboard), which vehicle in front may pose a risk/danger to the present vehicle and may require the computer system to take a corrective measure, be it braking or otherwise changing speed, stopping or changing lanes. On a more granular level, the challenge of the object detection is not just the binary detection (presence or absence of the object), but the speed and accuracy associated with such an analysis and determination (especially avoiding "false negatives", whereby the system does not identify an object which is indeed present in front or around the vehicle).

The acuteness of this problem is illustrated by the following hypothetical scenario. Imagine that the self-driving or partially-autonomous vehicle is driving along the route. A child (or an adult, a pet, and the like) runs in front of the vehicle. It is imperative that the computer system controlling the vehicle detects the presence of the object fast and take corrective actions to avoid the collision. Naturally, the faster the computer system detects the presence of the object, the more time the computer system will have to determine the corrective action and to command the vehicle to execute the corrective action.

A typical autonomous vehicle or self-driving car (SDC), for short, comprises a plurality of sensors to enable the SDC to capture and "understand" its surround area. Typically, more than one type of sensors is used. For example, a given implementation of the SDC can include one or more cameras, one or more LIDARs, and one or more radars.

It is generally known that some of these sensors are better at capturing certain scenes to enable better processing thereof by a controller (electronic device) associated with the SDC. Furthermore, several technologies have been proposed for merging and enriching one type of sensor data with data from another sensor. Despite the improvements in the capturing technology (i.e. ability of the sensors to capture raw data) and in processing algorithms (i.e. ability to process the raw data to enable proper planning of the SDC trajectory and corrective actions, if required), there still exists a problem with so called "blind spots".

A blind spot is a portion of the surrounding area of the SDC that is not visible to the electronic device that is controlling the SDC (i.e. the electronic device that determines the trajectory of the movement of the SDC). The blind spot can exist due to an obstacle presence in a path of view of a particular sensor. For example, presence of a large vehicle (such as a truck, a bus, or the like) in the viewport of the sensor may obstruct the view of an object located behind it (vis-a-vis the sensor). As such, this hidden object would not be visible from the data captured by the sensor and the large vehicle, would in a sense, create a blind spot.

Another type of blind zones is attributable to physical limitations of the sensors. For example, a given camera or a given LIDAR or a given radar may have certain physical constrains where the given camera or the given LIDAR or the given radar can capture data. Such limitations can be distance-based or height based or surrounding objects based.

U.S. Pat. No. 9,805,274 (issued on Oct. 31, 2017 and assigned to Honda Motor Co., LTD) discloses a system and method for verifying detection of partially occluded objects (e.g., pedestrians) in the vicinity of a vehicle. An image input device captures an image and/or video of surroundings. An object detector detects partially occluded pedestrians and other objects in received image information. The detection of a partially occluded pedestrian is verified when a detection window of the partially occluded pedestrian overlaps with a detection window of an occluding object, and the occluding object window is closer to the image input device than the partially occluded object window. Optionally, a range-finding sensor, such as a LIDAR device, determines a range to objects located in the direction of the partially occluded object. The detection of the partially occluded object is verified when the range of one of the other objects located in the direction of the partially occluded object is less than that of the partially occluded object.

U.S. Pat. No. 10,137,890 (issued on Nov. 27, 2018 and assigned to Toyota Motor Engineering & Manufacturing North America, Inc.) discloses classification of obstacles located in an external environment of a vehicle. At least a portion of the external environment can be sensed using one or more sensors to acquire sensor data. An obstacle candidate can be identified based on the acquired sensor data. An occlusion status for the identified obstacle candidate can be determined. The occlusion status can be a ratio of acquired sensor data for the obstacle candidate that is occluded to all acquired sensor data for the obstacle candidate. A classification for the obstacle candidate can be determined based on the determined occlusion status. A driving maneuver for the vehicle can be determined at least partially based on the determined classification for the obstacle candidate. The vehicle can be caused to implement the determined driving maneuver. The vehicle can be an autonomous vehicle.

US 2019/0011913 (published on Jan. 10, 2019 and assigned to GM Global Technology Operations LLC) discloses systems and method for controlling a vehicle. In one embodiment, a method includes: receiving, by a processor, sensor data sensed from an environment of the vehicle; processing, by the processor, the sensor data to determine a blind spot of the environment of the vehicle; setting, by the processor, an operation mode of the vehicle to a caution mode based on the determined blind spot; and controlling, by the processor, operation of the vehicle based on the operation mode.

SUMMARY

It is an object of the present technology to ameliorate at least some of the inconveniences present in the prior art.

In accordance with a first broad aspect of the present technology, there is provided a method of processing Light Detection and Ranging (LIDAR) point cloud data. The method is executable by an electronic device, communicatively coupled to a LIDAR installed on a vehicle, the LIDAR having a plurality of lasers and configured for capturing LIDAR point cloud data having a plurality of LIDAR points, the electronic device further executing a detection algorithm for detecting presence of at least one object surrounding the vehicle based on the LIDAR point cloud data, the method comprising: receiving, by the electronic device, a first LIDAR point cloud data captured by the LIDAR; executing, by the electronic device, a Machine Learning Algorithm (MLA), the MLA configured to execute: analyzing, by the electronic device, a first plurality of LIDAR points of the first LIDAR point cloud data in relation to a response pattern of the plurality of lasers to determine a current pattern of the LIDAR points; retrieving, by the electronic device, a grid representation data of a surrounding area of the vehicle; based on the current pattern and the grid representation data, determining if the first plurality of LIDAR points is associated with a blind spot, the blind spot preventing the detection algorithm to detect the presence of at least one object surrounding the vehicle conditioned on the at least one object being present.

In some implementations of the method, the method further comprises training the MLA by: feeding the MLA with a plurality of training set objects, each of the plurality of training set objects including: a training pattern of the LIDAR points; a training grid representation data of an associated surrounding training area; a label indicative of whether the detection algorithm is able to detect the presence of at least one training object surrounding the vehicle conditioned on the at least one training object being present.

In some implementations of the method, the method further comprises determining, by a secondary algorithm, whether the at least one training object is present.

In some implementations of the method, the secondary algorithm comprises analyzing image data captured by one of the vehicle and another vehicles, the image data indicative of the at least one training object being present.

In some implementations of the method, the secondary algorithm comprises analyzing presence of at least one training object at a time prior to executing the training and a movement trajectory associated therewith.

In some implementations of the method, the analyzing presence of at least one training object further comprises determining that based on the movement trajectory and a time difference between a training time and the time prior, the at least one training object should still be visible in the LIDAR points.

In some implementations of the method, in response to the detection of the blind spot in the first plurality of LIDAR points, the method further comprises controlling the vehicle to apply at least one remedial action.

In some implementations of the method, the at least one remedial action comprises obtaining additional sensor data from at least one additional sensor associated with the vehicle in an attempt to correct the blind spot.

In some implementations of the method, the at least one remedial action comprises controlling the vehicle to augment vehicle movement.

In some implementations of the method, the controlling the vehicle to augment vehicle movement comprises causing the vehicle one of: to slow down, to change trajectory, to execute emergency braking and to accelerate.

In some implementations of the method, the determining if the first plurality of LIDAR points is associated with the blind spot is further based on a geometric pattern of the plurality of lasers.

In some implementations of the method, the response pattern of the plurality of lasers is indicative of a totality of response that the LIDAR should receive in response to emitting light by the plurality of lasers.

In some implementations of the method, the grid representation data is representative of a grid with a center point located at the vehicle.

In some implementations of the method, the grid moves with a movement of the vehicle.

In some implementations of the method, the method further comprises generating the grid representation data as an occupancy grid.

In accordance with another broad aspect of the present technology, there is provided a system comprising: an electronic device, a LIDAR communicatively coupled to the electronic device, the LIDAR having a plurality of lasers and configured for capturing LIDAR point cloud data having a plurality of LIDAR points, the electronic device configured to execute a detection algorithm for detecting presence of at least one object in a surrounding area based on the LIDAR point cloud data. The electronic device is configured to: receive a first LIDAR point cloud data captured by the LIDAR; execute a Machine Learning Algorithm (MLA), the MLA configured to execute: analyzing, by the electronic device, a first plurality of LIDAR points of the first LIDAR point cloud data in relation to a response pattern of the plurality of lasers to determine a current pattern of the LIDAR points; retrieving, by the electronic device, a grid representation data of the surrounding area; based on the current pattern and the grid representation data, determining if the first plurality of LIDAR points is associated with a blind spot, the blind spot preventing the detection algorithm to detect the presence of at least one object in the surrounding area conditioned on the at least one object being present.

In some implementations of the system, the LIDAR is associated with a vehicle.

In some implementations of the system, the LIDAR and the electronic device are mounted on a vehicle.

In some implementations of the system, the detection algorithm is a first MLA different from the MLA.

In some implementations of the system, the grid representation data is implemented as a occupancy grid.

In some implementations of the system, the detection algorithm is a first MLA different from the MLA.

In some implementations of the system, the electronic device is at least one of a local electronic device, a server remotely coupled to the vehicle, and a sub-system of the local electronic device and the server.

In the context of the present specification, a "server" is a computer program that is running on appropriate hardware and is capable of receiving requests (e.g. from client devices) over a network, and carrying out those requests, or causing those requests to be carried out. The hardware may be implemented as one physical computer or one physical computer system, but neither is required to be the case with respect to the present technology. In the present context, the use of the expression a "server" is not intended to mean that every task (e.g. received instructions or requests) or any particular task will have been received, carried out, or caused to be carried out, by the same server (i.e. the same software and/or hardware); it is intended to mean that any number of software elements or hardware devices may be involved in receiving/sending, carrying out or causing to be carried out any task or request, or the consequences of any task or request; and all of this software and hardware may be one server or multiple servers, both of which are included within the expression "at least one server".

In the context of the present specification, "electronic device" is any computer hardware that is capable of running software appropriate to the relevant task at hand. In the context of the present specification, the term "electronic device" implies that a device can function as a server for other electronic devices and client devices, however it is not required to be the case with respect to the present technology. Thus, some (non-limiting) examples of electronic devices include personal computers (desktops, laptops, netbooks, etc.), smart phones, and tablets, as well as network equipment such as routers, switches, and gateways. It should be understood that in the present context the fact that the device functions as an electronic device does not mean that it cannot function as a server for other electronic devices. The use of the expression "an electronic device" does not preclude multiple client devices being used in receiving/sending, carrying out or causing to be carried out any task or request, or the consequences of any task or request, or steps of any method described herein.

In the context of the present specification, "client device" is any computer hardware that is capable of running software appropriate to the relevant task at hand. In the context of the present specification, in general the term "client device" is associated with a user of the client device. Thus, some (non-limiting) examples of client devices include personal computers (desktops, laptops, netbooks, etc.), smart phones, and tablets, as well as network equipment such as routers, switches, and gateways It should be noted that a device acting as a client device in the present context is not precluded from acting as a server to other client devices. The use of the expression "a client device" does not preclude multiple client devices being used in receiving/sending, carrying out or causing to be carried out any task or request, or the consequences of any task or request, or steps of any method described herein.

In the context of the present specification, the expression "information" includes information of any nature or kind whatsoever capable of being stored in a database. Thus information includes, but is not limited to audiovisual works (images, movies, sound records, presentations etc.), data (location data, numerical data, etc.), text (opinions, comments, questions, messages, etc.), documents, spreadsheets, etc.

In the context of the present specification, the expression "software component" is meant to include software (appropriate to a particular hardware context) that is both necessary and sufficient to achieve the specific function(s) being referenced.

In the context of the present specification, the expression "computer information storage media" (also referred to as "storage media") is intended to include media of any nature and kind whatsoever, including without limitation RAM, ROM, disks (CD-ROMs, DVDs, floppy disks, hard drivers, etc.), USB keys, solid state-drives, tape drives, etc. A plurality of components may be combined to form the computer information storage media, including two or more media components of a same type and/or two or more media components of different types.

In the context of the present specification, a "database" is any structured collection of data, irrespective of its particular structure, the database management software, or the computer hardware on which the data is stored, implemented or otherwise rendered available for use. A database may reside on the same hardware as the process that stores or makes use of the information stored in the database or it may reside on separate hardware, such as a dedicated server or plurality of servers.

In the context of the present specification, the words "first", "second", "third", etc. have been used as adjectives only for the purpose of allowing for distinction between the nouns that they modify from one another, and not for the purpose of describing any particular relationship between those nouns. Thus, for example, it should be understood that, the use of the terms "first database" and "third server" is not intended to imply any particular order, type, chronology, hierarchy or ranking (for example) of/between the server, nor is their use (by itself) intended imply that any "second server" must necessarily exist in any given situation. Further, as is discussed herein in other contexts, reference to a "first" element and a "second" element does not preclude the two elements from being the same actual real-world element. Thus, for example, in some instances, a "first" server and a "second" server may be the same software and/or hardware components, in other cases they may be different software and/or hardware components.

Implementations of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects and advantages of implementations of the present technology will become apparent from the following description, the accompanying drawings and the appended claims.

BRIEF DESCRIPTION OF THE DRAWINGS

These and other features, aspects and advantages of the present technology will become better understood with regard to the following description, appended claims and accompanying drawings where:

DETAILED DESCRIPTION

Figure 1:
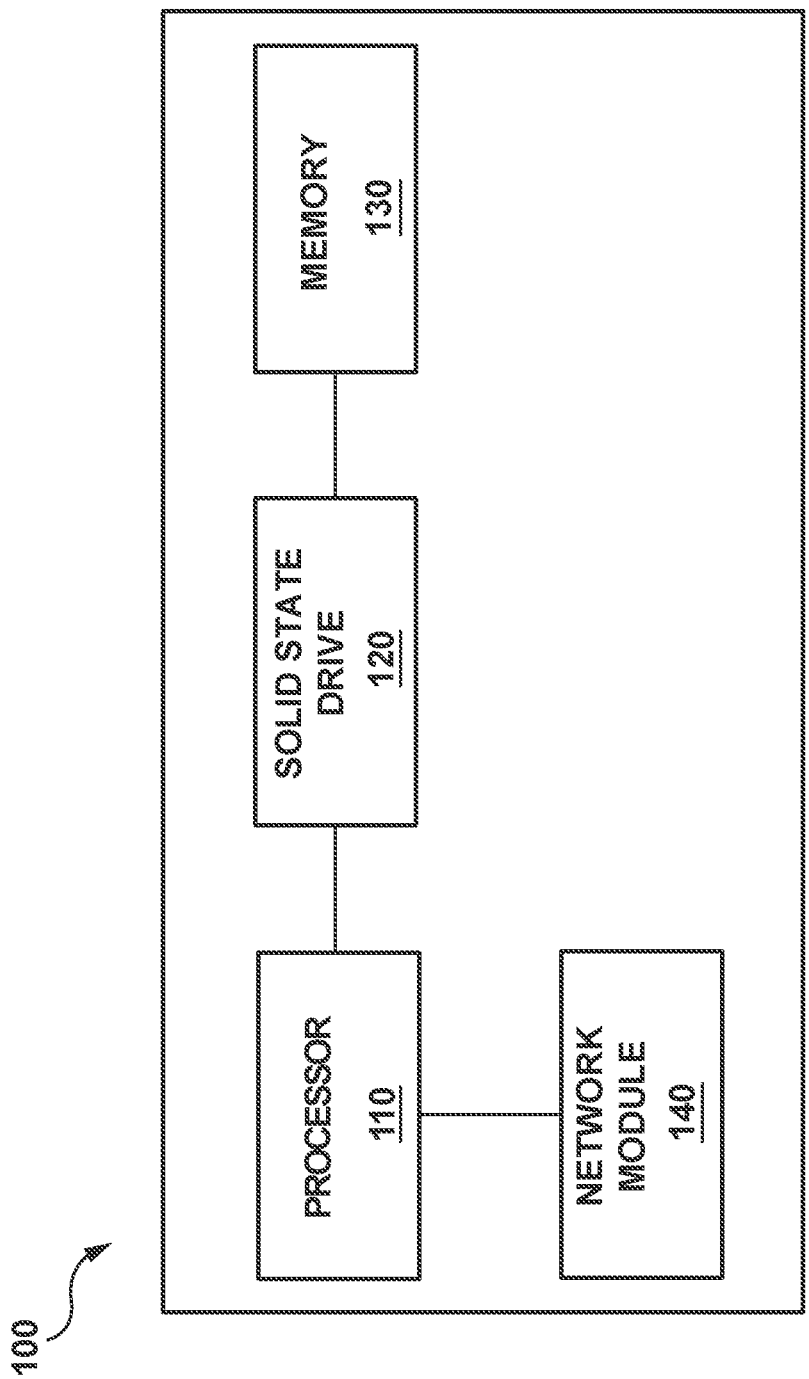
FIG. 1 depicts a schematic diagram of an example computer system for implementing certain embodiments of systems and/or methods of the present technology.

The examples and conditional language recited herein are principally intended to aid the reader in understanding the principles of the present technology and not to limit its scope to such specifically recited examples and conditions. It will be appreciated that those skilled in the art may devise various arrangements which, although not explicitly described or shown herein, nonetheless embody the principles of the present technology and are included within its spirit and scope.

Furthermore, as an aid to understanding, the following description may describe relatively simplified implementations of the present technology. As persons skilled in the art would understand, various implementations of the present technology may be of a greater complexity.

In some cases, what are believed to be helpful examples of modifications to the present technology may also be set forth. This is done merely as an aid to understanding, and, again, not to define the scope or set forth the bounds of the present technology. These modifications are not an exhaustive list, and a person skilled in the art may make other modifications while nonetheless remaining within the scope of the present technology. Further, where no examples of modifications have been set forth, it should not be interpreted that no modifications are possible and/or that what is described is the sole manner of implementing that element of the present technology.

Moreover, all statements herein reciting principles, aspects, and implementations of the technology, as well as specific examples thereof, are intended to encompass both structural and functional equivalents thereof, whether they are currently known or developed in the future. Thus, for example, it will be appreciated by those skilled in the art that any block diagrams herein represent conceptual views of illustrative circuitry embodying the principles of the present technology. Similarly, it will be appreciated that any flowcharts, flow diagrams, state transition diagrams, pseudocode, and the like represent various processes which may be substantially represented in computer-readable media and so executed by a computer or processor, whether or not such computer or processor is explicitly shown.

The functions of the various elements shown in the figures, including any functional block labeled as a "processor", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read-only memory (ROM) for storing software, random access memory (RAM), and non-volatile storage. Other hardware, conventional and/or custom, may also be included.

Software modules, or simply modules which are implied to be software, may be represented herein as any combination of flowchart elements or other elements indicating performance of process steps and/or textual description. Such modules may be executed by hardware that is expressly or implicitly shown.

With these fundamentals in place, we will now consider some non-limiting examples to illustrate various implementations of aspects of the present technology.

Referring initially to FIG. 1, there is shown a computer system 100 suitable for use with some implementations of the present technology, the computer system 100 comprising various hardware components including one or more single or multi-core processors collectively represented by processor 110, a solid-state drive 120, a memory 130, which may be a random-access memory or any other type of memory. Communication between the various components of the computer system 100 may be enabled by one or more internal and/or external buses (not shown) (e.g. a PCI bus, universal serial bus, IEEE 1394 "Firewire" bus, SCSI bus, Serial-ATA bus, etc.), to which the various hardware components are electronically coupled. According to embodiments of the present technology, the solid-state drive 120 stores program instructions suitable for being loaded into the memory 130 and executed by the processor 110 for determining a presence of an object. For example, the program instructions may be part of a vehicle control application executable by the processor 110. It is noted that the computer system 100 may have additional and/or optional components (not depicted), such as network communication modules, localization modules, and the like.

Figure 2:
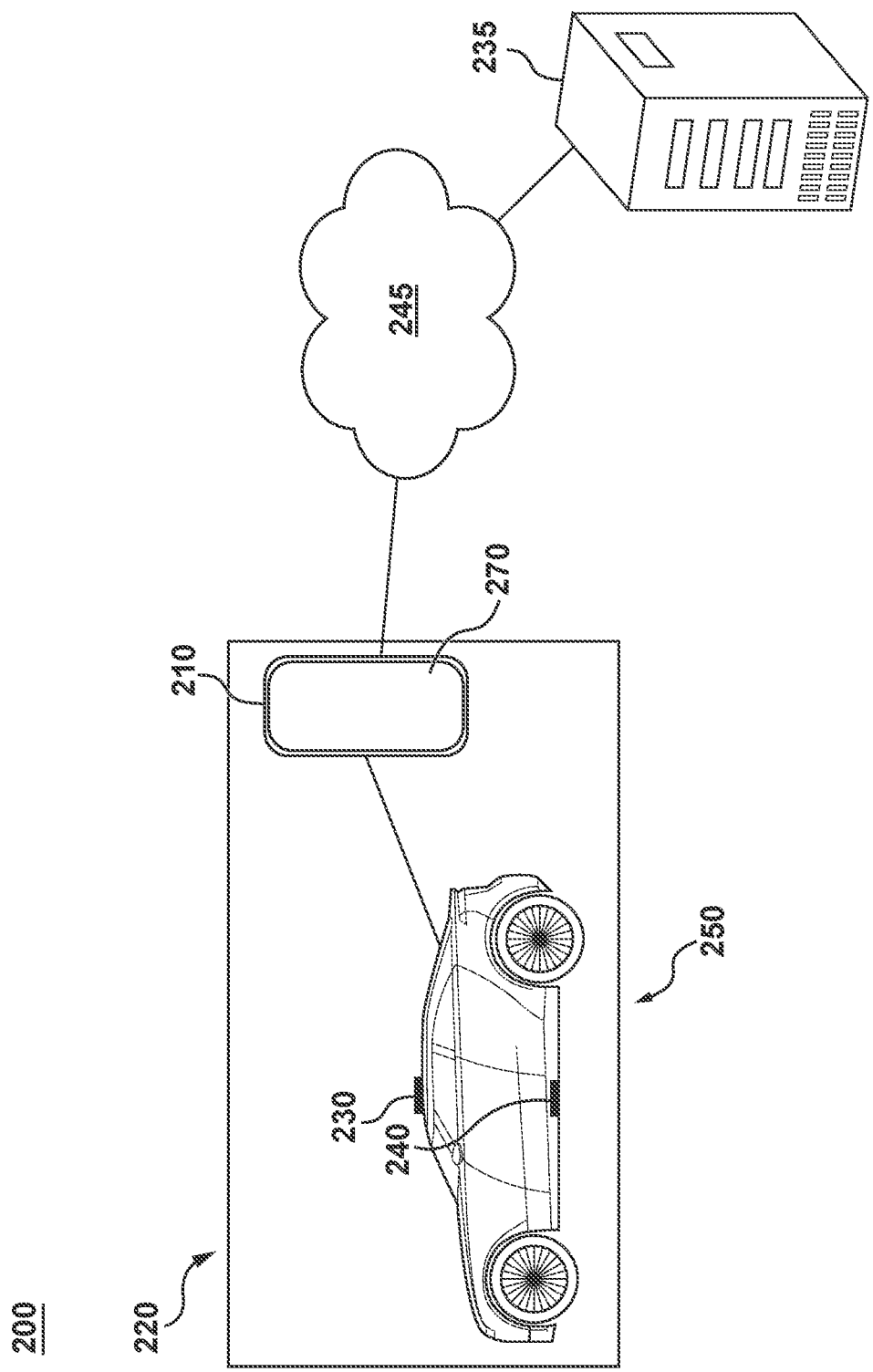
FIG. 2 depicts a networked computing environment being suitable for use with some implementations of the present technology.

FIG. 2 illustrates a networked computer environment 200 suitable for use with some embodiments of the systems and/or methods of the present technology. The networked computer environment 200 comprises an electronic device 210 associated with a vehicle 220, or associated with a user (not depicted) who can operate the vehicle 220, a server 235 in communication with the electronic device 210 via a communication network 245 (e.g. the Internet or the like, as will be described in greater detail herein below). Optionally, the networked computer environment 200 can also include a GPS satellite (not depicted) transmitting and/or receiving a GPS signal to/from the electronic device 210. It will be understood that the present technology is not limited to GPS and may employ a positioning technology other than GPS. It should be noted that the GPS satellite can be omitted altogether.

The vehicle 220 to which the electronic device 210 is associated may comprise any leisure or transportation vehicle such as a private or commercial car, truck, motorbike or the like. The vehicle may be user operated or a driver-less vehicle. It should be noted that specific parameters of the vehicle 220 are not limiting, these specific parameters including: vehicle manufacturer, vehicle model, vehicle year of manufacture, vehicle weight, vehicle dimensions, vehicle weight distribution, vehicle surface area, vehicle height, drive train type (e.g. 2× or 4×), tyre type, brake system, fuel system, mileage, vehicle identification number, and engine size.

The implementation of the electronic device 210 is not particularly limited, but as an example, the electronic device 210 may be implemented as a vehicle engine control unit, a vehicle CPU, a vehicle navigation device (e.g. TomTom™ vehicle navigation device, Garmin™ vehicle navigation device), a tablet, a personal computer built into the vehicle 220 and the like. Thus, it should be noted that the electronic device 210 may or may not be permanently associated with the vehicle 220. Additionally or alternatively, the electronic device 210 can be implemented in a wireless communication device such as a mobile telephone (e.g. a smart-phone or a radio-phone). In certain embodiments, the electronic device 210 has a display 270.

The electronic device 210 may comprise some or all of the components of the computer system 100 depicted in FIG. 1. In certain embodiments, the electronic device 210 is on-board computer device and comprises the processor 110, the solid-state drive 120 and the memory 130. In other words, the electronic device 210 comprises hardware and/or software and/or firmware, or a combination thereof, for determining the presence of an object around the vehicle 220, as will be described in greater detail below.

In accordance to the non-limiting embodiments of the present technology, the electronic device 210 further comprises or has access to: a first sensor 230 configured to capture an image of a surrounding area 250 and a second sensor 240 configured to capture a 3-D point cloud data of the surrounding area 250. The first sensor 230 and the second sensor 240 are operatively coupled to the processor 110 for transmitting the so-captured information to the processor 110 for processing thereof, as will be described in greater detail herein below.

In a specific non-limiting example, the first sensor 230 comprises a camera. How the camera is implemented is not particularly limited. For example, in one specific non-limiting embodiments of the present technology, the camera can be implemented as a mono camera with resolution sufficient to detect objects at a pre-determined distance of up to about 30 m (although cameras with other resolutions and ranges are within the scope of the present disclosure). The camera can be mounted on an interior, upper portion of a windshield of the vehicle 220, but other locations are within the scope of the present disclosure, including on a back window, side windows, front hood, rooftop, front grill, or front bumper of the vehicle 220. In some non-limiting embodiments of the present technology, the first sensor 230 can be mounted in a dedicated enclosure (not depicted) mounted on the top of the vehicle 220.

In some non-limiting embodiments of the present technology, the first sensor 230 can be implemented as a plurality of cameras. For example, the plurality of cameras may have a sufficient number of cameras to capture a surrounding/panoramic image of the surrounding area 250.

In some embodiments of the present technology, the camera (or one or more cameras that make up the implementation of the first sensor 230) is configured to capture a pre-determine portion of the surrounding area 250 around the vehicle 220. In some embodiments of the present technology, the camera is configured to capture an image (or a series of images) that represent approximately 90 degrees of the surrounding area 250 around the vehicle 220 that are along a movement path of the vehicle 220.

In other embodiments of the present technology, the camera is configured to capture an image (or a series of images) that represent approximately 180 degrees of the surrounding area 250 around the vehicle 220 that are along a movement path of the vehicle 220. In yet additional embodiments of the present technology, the camera is configured to capture an image (or a series of images) that represent approximately 360 degrees of the surrounding area 250 around the vehicle 220 that are along a movement path of the vehicle 220 (in other words, the entirety of the surrounding area around the vehicle 220).

In a specific non-limiting example, the first sensor 230 can be implemented as the camera may be of the type available from FLIR Integrated Imaging Solutions Inc., 12051 Riverside Way, Richmond, BC, V6W 1K7, Canada. It should be expressly understood that the first sensor 230 can be implemented in any other suitable equipment.

In a specific non-limiting example, the second sensor 240 comprises a Light Detection and Ranging (LIDAR) instrument (or LIDAR for short). Lidar stands for LIght Detection and Ranging. It is expected that a person skilled in the art will understand the functionality of the LIDAR instrument, but briefly speaking, a transmitter (not depicted) of the second sensor 240 implemented as the LIDAR sends out a laser pulse and the light particles (photons) are scattered back to a receiver (not depicted) the second sensor 240 implemented as the LIDAR instrument. The photons that come back to the receiver are collected with a telescope and counted as a function of time. Using the speed of light ($\sim 3 \times 10^8$ m/s), the processor 110 can then calculate how far the photons have traveled (in the round trip). Photons can be scattered back off of many different entities surrounding the vehicle 220, such as other particles (aerosols or molecules) in the atmosphere, other card, stationary objects or potential obstructions in front of the vehicle 220.

In a specific non-limiting example, the second sensor 240 can be implemented as the LIDAR based sensor that may be of the type available from Velodyne LiDAR, Inc. of 5521 Hellyer Avenue, San Jose, Calif. 95138, United States of America. It should be expressly understood that the second sensor 240 can be implemented in any other suitable equipment.

In some embodiments of the present technology, the second sensor 240 can be implemented as a plurality of LIDAR based sensors, such as three for example or any other suitable number. In some embodiments of the present technology, the second sensor 240 (whether implemented as a single LIDAR based sensor or multiple LIDAR based sensors) can be housed in the above-mentioned enclosure (not separately depicted) located on the roof of the vehicle 220.

In those embodiments of the present technology, where the second sensor 240 is implemented as multiple LIDAR based sensors housed in the enclosure (not depicted), the spatial placement of the multiple LIDAR based sensors can be designed taking into account the specific technical configuration of the multiple LIDAR based sensors, configuration of the enclosure, weather conditions of the area where the vehicle 220 is to be used (such as frequent rain, snow, and other elements) or the like.

In some embodiments of the present technology, the first sensor 230 and the second sensor 240 are calibrated such that for the image captured by the first sensor 230 and the 3-D point cloud captured by the second sensor 240, the processor 110 is configured to identify a given region of the image that correspond to a given region of the 3-D point cloud. This calibration can be executed during the manufacturing and/or set up of the vehicle 220. Or at any suitable time thereafter or, in other words, the calibration can be executed during retrofitting the vehicle 220 with the first sensor 230 and the second sensor 240 in accordance with the non-limiting embodiments of the present technology contemplated herein. Alternatively, the calibration can be executed during equipping the vehicle 220 with the first sensor 230 and the second sensor 240 in accordance with the non-limiting embodiments of the present technology contemplated herein.

In some non-limiting embodiments of the present technology, the vehicle 220 can include additional sensors (not depicted), such as radars and the like.

In some embodiments of the present technology, the communication network 245 is the Internet. In alternative non-limiting embodiments, the communication network 245 can be implemented as any suitable local area network (LAN), wide area network (WAN), a private communication network or the like. It should be expressly understood that implementations for the communication network are for illustration purposes only. A communication link (not separately numbered) between the electronic device 210 and the communication network 245 is implemented will depend inter alia on how the electronic device 210 is implemented. Merely as an example and not as a limitation, in those embodiments of the present technology where the electronic device 210 is implemented as a wireless communication device such as a smartphone or a navigation device, the communication link can be implemented as a wireless communication link. Examples of wireless communication links include, but are not limited to, a 3G communication network link, a 4G communication network link, and the like. The communication network 245 may also use a wireless connection with the server 235.

In some embodiments of the present technology, the server 235 is implemented as a conventional computer server and may comprise some or all of the components of the computer system 1 of FIG. 1. In one non-limiting example, the server 235 is implemented as a Dell™ PowerEdge™ Server running the Microsoft™ Windows Server™ operating system, but can also be implemented in any other suitable hardware, software, and/or firmware, or a combination thereof. In the depicted non-limiting embodiments of the present technology, the server is a single server. In alternative non-limiting embodiments of the present technology (not shown), the functionality of the server 235 may be distributed and may be implemented via multiple servers.

In some non-limiting embodiments of the present technology, the processor 110 of the electronic device 210 can be in communication with the server 235 to receive one or more updates. The updates can be, but are not limited to, software updates, map updates, routes updates, weather updates, and the like. In some embodiments of the present technology, the processor 110 can also be configured to transmit to the server 235 certain operational data, such as routes travelled, traffic data, performance data, and the like. Some or all data transmitted between the vehicle 220 and the server 235 may be encrypted and/or anonymized.

In the description provided herein, when certain processes and method steps are executed by the processor 110 of the electronic device 210, it should be expressly understood that such processes and method steps can be executed solely by the processor 110, in a shared manner (i.e. distributed) between the processor 110 and the server 235, or solely by the server 235. In other words, when the present description refers to the processor 110 or the electronic device 210 executing certain processes or method steps, it is to expressly cover processes or steps executed by the processor 110, by the server 235, or jointly executed by the processor 110 and the server 235.

Figure 3:
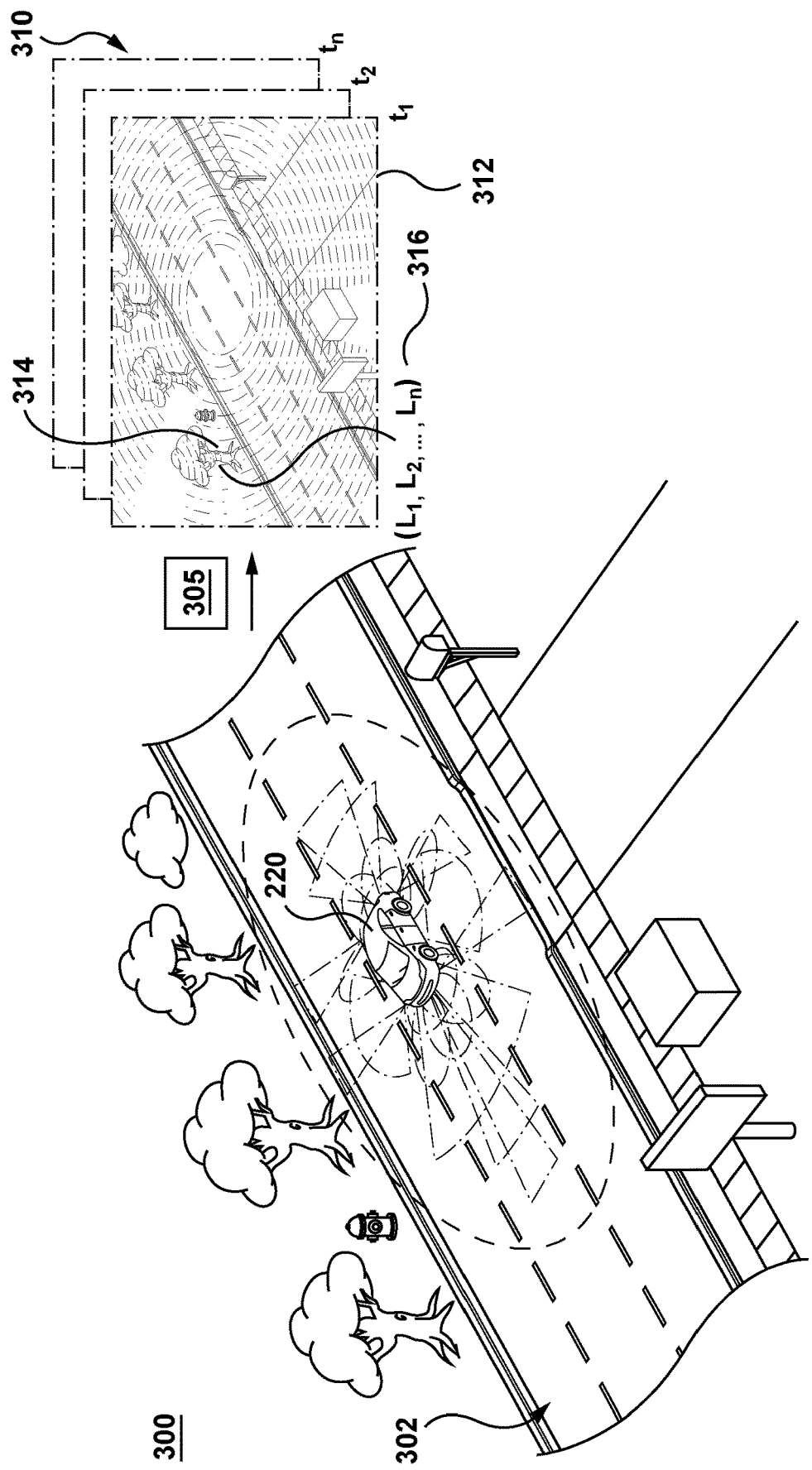
FIG. 3 depicts a LIDAR data acquisition procedure executed by a processor of an electronic device of the networked computing environment of FIG. 2, the procedure for receiving the 3-D point cloud data 310 captured by a sensor of a vehicle present in the networked computing environment of FIG. 2.

With reference to FIG. 3, there is depicted a process 300 (also referred to as a LIDAR data acquisition procedure 300), executed by the processor 110, for receiving the 3-D point cloud data 310 captured by the second sensor 240.

In some non-limiting embodiments of the present technology, the process of receiving the 3-D point cloud data 310 can be executed in a continuous manner. In other embodiments of the present technology, the process of receiving the 3-D point cloud data 310 can be implemented at predetermined intervals, such every 2 milliseconds or any other suitable time interval.

To execute the LIDAR data acquisition procedure 300, the vehicle 220 travels on a road 302, and the electronic device 210 is configured to acquire with the second sensor 240 sensor data 305 representative of objects in the surrounding area 250 of the vehicle 220.

The vehicle 220 travels on the road 302, and the electronic device 210 is configured to cause the second sensor 240 to acquire data about the surrounding area 250 of the vehicle 220 at different locations on the road 302.

The electronic device 210 receives data about the surrounding area 250 of the vehicle 220 at different locations on the road 302 in the form of LIDAR point cloud 312.

Generally speaking, the LIDAR point cloud 312 is a set of LIDAR points in the form of a 3D point cloud, where a given LIDAR point 314 is a point in 3D space indicative of at least a portion of a surface of a given object on or around the road 302. In some non-limiting embodiments of the present technology, the LIDAR point cloud 312 may be organized in layers, where points in each layer are also organized in an elliptical fashion and the starting points of all elliptical layers are considered to share a similar orientation.

The given LIDAR point 314 in the LIDAR point cloud 312 is associated with LIDAR parameters 316 (depicted in FIG. 3 as $L_1$, $L_2$, and $L_N$). As a non-limiting example, the LIDAR parameters 316 may include: distance, intensity, and angle, as well as other parameters relating to information that may be acquired by a second sensor 240. The second sensor 240 may acquire a LIDAR point cloud at each time step t while the vehicle 220 is travelling, thereby acquiring a set of 3-D point cloud data 310.

It is contemplated that in some non-limiting embodiments of the present technology, the vehicle 220 can also acquire images with the first sensor 230 and enrich the LIDAR point cloud 312 with the image data obtained from the first sensor 230. The process for enriching LIDAR point cloud 312 with the image data obtained by the first sensor 230 is described in a co-owned patent application entitled METHODS AND SYSTEMS FOR COMPUTER-BASED DETERMINING OF PRESENCE OF OBJECTS, bearing an application Ser. No. 16/369,865 filed with the United States Patent and Trademark Office on Mar. 29, 2019, the content of which is hereby incorporated by reference in its entirety.

Figure 4:
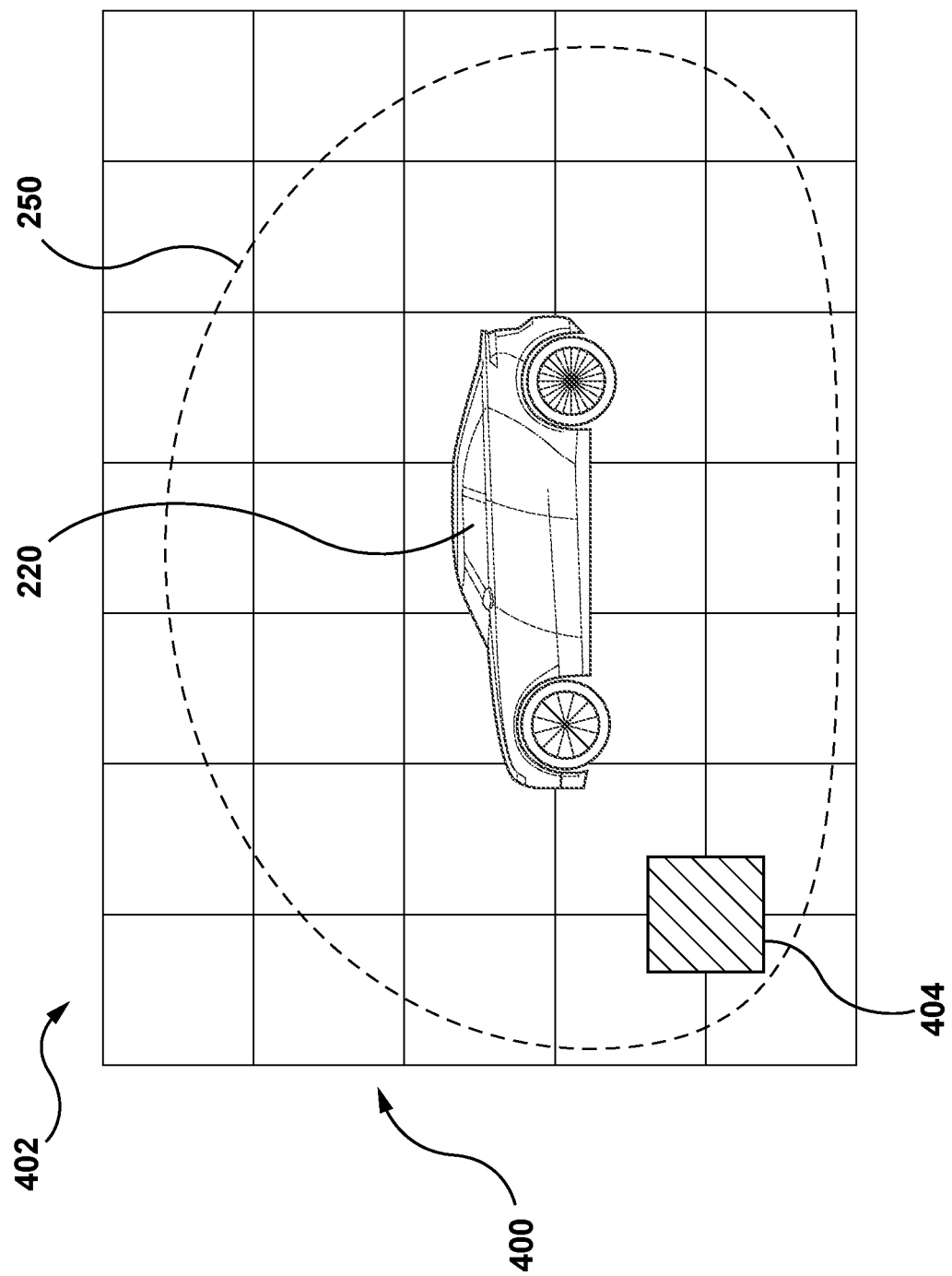
FIG. 4 depicts a grid representation data acquisition procedure, executable by the processor of the electronic device of the networked computing environment of FIG. 2, the procedure for receiving the grid representation data of the surrounding area 250 around the vehicle present in the networked computing environment of FIG. 2.

With reference to FIG. 4, there is depicted a process 400 (also referred to as a grid representation data acquisition procedure 400), executed by the processor 110, for receiving the grid representation data 402 of the surrounding area 250 around the vehicle 220. The grid representation data 402 is associated with the vehicle 220. In some non-limiting embodiments of the present technology, the grid representation data 402 is centered on the vehicle 220 and moves with the vehicle 220 as the vehicle 220 moves along the road 302. Put another way, the process 400 can be executed as the vehicle 220 moves in order to obtain a then current version of the grid representation data 402.

In some embodiments of the present technology, the process of obtaining the grid representation data 402 in a continuous or a substantially continuous manner. For example, the process of obtaining the grid representation data 402 can be executed as often as permitted by physical constraints (such as processing speed) of the electronic device 210. In other non-limiting embodiments of the present technology, the process of obtaining the grid representation data 402 can be executed at pre-determined time intervals, such as for example, every 2 ms, every 5 ms, or the like.

In some non-limiting embodiments of the present technology, the grid representation data 402 contains information about other objects located in the surrounding area 250. In FIG. 4, a single instance of an other object 404 is depicted. In some non-limiting embodiments of the present technology, the other object 404 can be a static object, or in other words, an object that does not move (or is not intended to be moved). In other words, the other object 404 can be stationary that the vehicle 220 moves relative to, but which does not move relative to the Earth.

An example of the other object 404 that is stationary includes (but is not limited to): a house, an apartment building, a tree, a fence, a raised side walk, a multi-lane road raised divider, a parked vehicle, or the like. In some non-limiting embodiments of the present technology, the other object 404 (as an example of a plurality of other objects being potentially present in the surrounding area 250) can further include a movable (i.e. a non-static) object.

In some embodiments of the present technology, the grid representation data 402 can be obtained from a memory associated with the electronic device 210. In some embodiments of the present technology, the information to generate the grid representation data 402 can be stored in form of a map (such as 3D map, a High Definition map, or the like). In other non-limiting embodiments of the present technology, the grid representation data 402 can be generated "on the fly" by the electronic device 210, for example, based on image data obtained by the first sensor 230.

In some non-limiting embodiments of the present technology, the grid representation data 402 comprises an occupancy grid. Broadly speaking, the occupancy grid is a discretization of a road environment data into fixed-sized cells, each of which contains an indication of a probability the given cell is occupied. The occupancy grid is a basic data structure that is used as an alternative to storing full point clouds, for example.

Detection Algorithm

Figure 5:
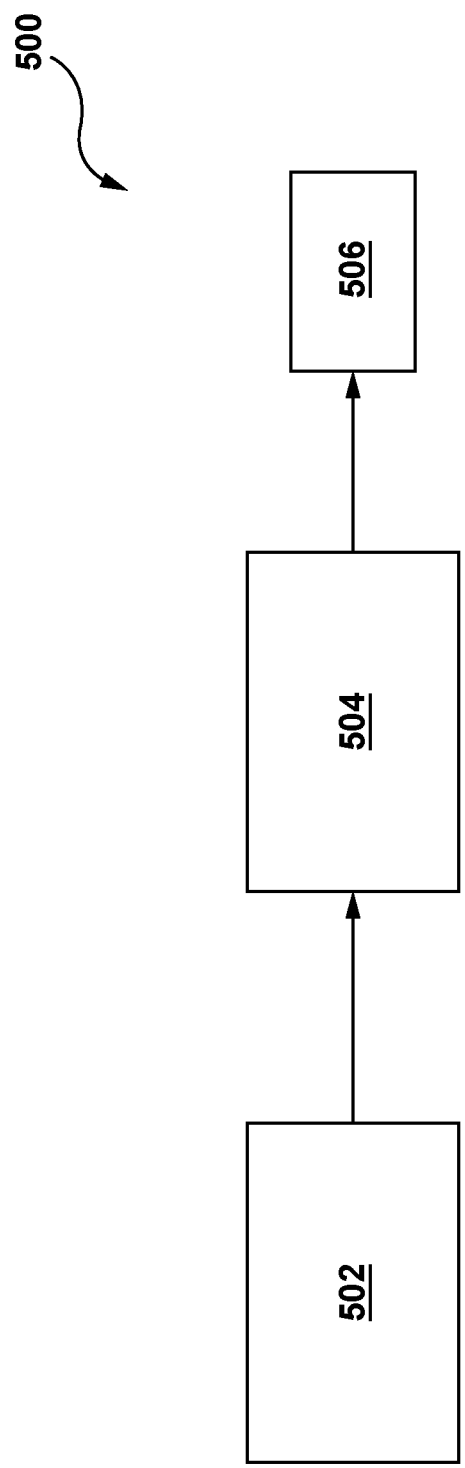
FIG. 5 depicts a detection process executable in the networked computing environment of FIG. 2, the process being configured to identify presence of objects in the surrounding area, and more specifically, those objects that may provide a collision risk to the vehicle and, thus, may require a change in the trajectory of the vehicle (such as changing course, braking, accelerating, and the like).

In accordance with the non-limiting embodiments of the present technology, the electronic device 210 is configured to execute a detection process 500, schematically depicted in FIG. 5. The detection process 500 is configured to identify presence of objects in the surrounding area 250, and more specifically, those objects that may provide a collision risk to the vehicle 220 and, thus, may require a change in the trajectory of the vehicle 220 (such as changing course, braking, accelerating, and the like).

The detection process 500 has a data acquisition routine 502 and an object presence prediction routine 504. The data acquisition routine 502 is configured to receive sensor data, such as the image of the surrounding area 250 from the first sensor 230 and the 3-D point cloud data of the surrounding area 250 from the second sensor 240. To the extent that that the vehicle 220 can include additional sensors (not depicted), such as radars and the like; the data acquisition routine 502 can be configured to obtain sensor data provided by those additional sensors.

The data acquisition routine 502 is configured to transmit the so-captured data (the image of the surrounding area 250 from the first sensor 230, the 3-D point cloud data of the surrounding area 250 from the second sensor 240, and the sensor data provided by those additional sensors potentially present in the vehicle 220) to the object presence prediction routine 504.

The object presence prediction routine 504 is configured to determine, based on the so-captured data (the image of the surrounding area 250 from the first sensor 230, the 3-D point cloud data of the surrounding area 250 from the second sensor 240, and the sensor data provided by those additional sensors potentially present in the vehicle 220) presence of an object in the surrounding area 250 of the vehicle 220, such as for example, the other object 404.

In some non-limiting embodiments of the present technology, the object presence prediction routine 504 is configured to generate a prediction indicative of a probability of a presence of the object in the surrounding area 250 (such as the other object 404). As such, in some non-limiting embodiments of the present technology, the object presence prediction routine 504 can be implemented as Machine Learning Algorithm (MLA) for generating the prediction. The MLA can be Neural Network based, a decision tree based, or any other suitable type of the MLA.

In some non-limiting embodiments of the present technology, the object presence prediction routine 504 uses a portion of the so-captured data (the image of the surrounding area 250 from the first sensor 230, the 3-D point cloud data of the surrounding area 250 from the second sensor 240, and the sensor data provided by those additional sensors potentially present in the vehicle 220). For example, the object presence prediction routine 504 can render the prediction based on the image data alone. Alternatively, the object presence prediction routine 504 can render the prediction based on the 3-D point cloud data alone.

In alternative non-limiting embodiments of the present technology, the object presence prediction routine 504 uses a combination of the so-captured data (the image of the surrounding area 250 from the first sensor 230, the 3-D point cloud data of the surrounding area 250 from the second sensor 240, and the sensor data provided by those additional sensors potentially present in the vehicle 220). For example, the object presence prediction routine 504 can render the prediction based on a combination the image data and the 3-D point cloud data. In yet another example, the object presence prediction routine 504 can render the prediction based on a combination of at least some of: the image data, the 3-D point cloud data and the other sensor data.

As such, the output of the detection process 500 is a prediction 506 indicative of a probability of a presence of the object in the surrounding area 250 (such as the other object 404).

Machine Learning Algorithm (MLA) for Predicting Blind Spots

In accordance with the non-limiting embodiments of the present technology, the electronic device 210 is configured to execute a Machine Learning Algorithm (MLA) for predicting a blind spot associated, for example, with the second sensor 240.

Figure 6:
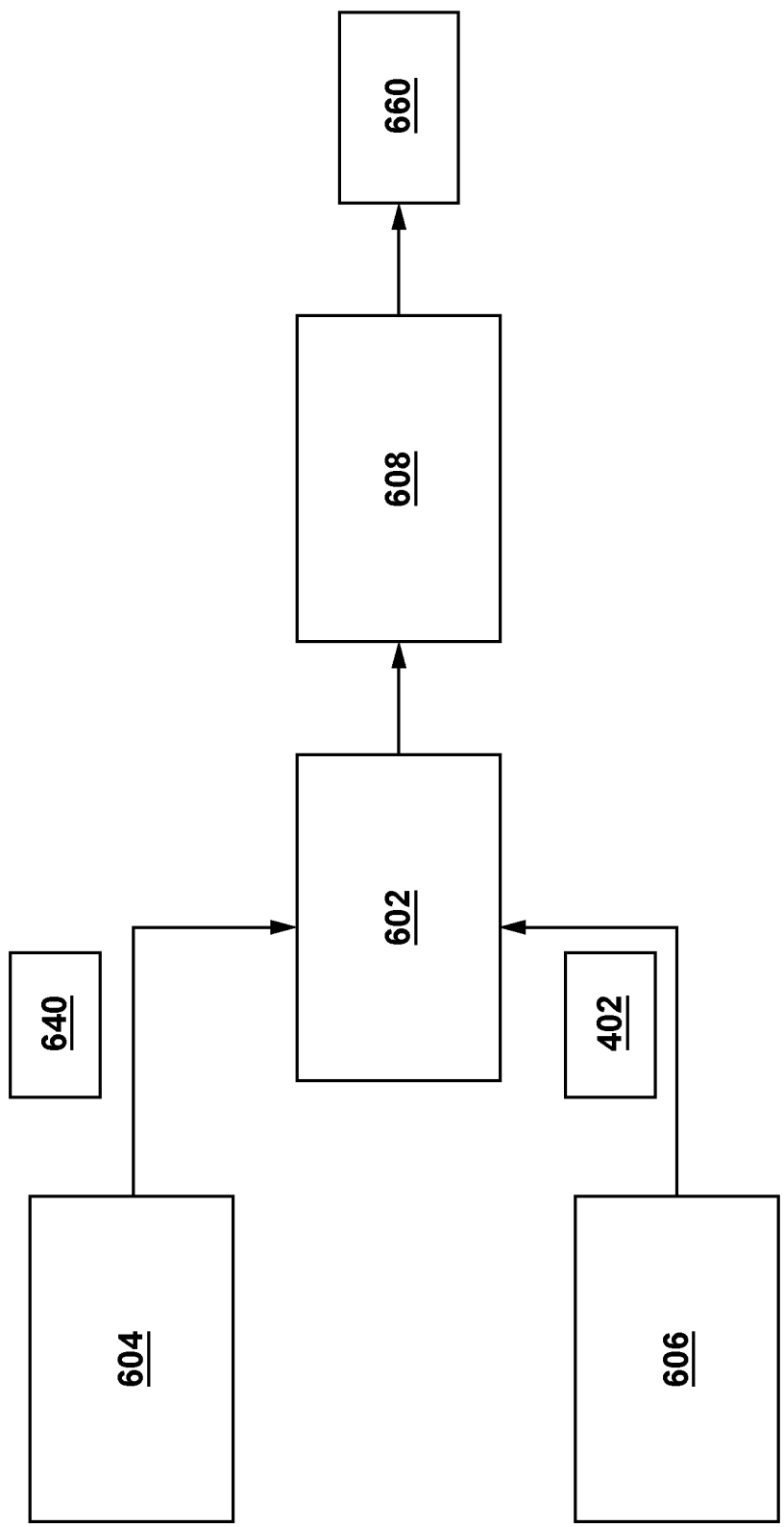
FIG. 6 depicts a schematic illustration of operation of a Machine Learning Algorithm (MLA) for predicting blind spot of at least some sensors associated with the vehicle present in the networked computing environment of FIG. 2.

With reference to FIG. 6, there is depicted a schematic illustration of an operation of an MLA 602. The MLA 602 can be Neural Network based, a decision tree based, or any other suitable type of the MLA. The MLA 602 can be a different MLA from the one used for implementing the object presence prediction routine 504.

Broadly speaking, the MLA 602 is configured to execute the following steps.

Step 604—Analyzing a First Plurality of LIDAR Points of the First Point Cloud Data in Relation to a Response Pattern of the Plurality of Lasers to Determine a Current Pattern of the LIDAR Points As was depicted and described with reference to FIG. 3, the electronic device 210 is configured to execute the LIDAR data acquisition procedure 300 for receiving the 3-D point cloud data 310 captured by the second sensor 240—i.e. the plurality of LIDAR points represented as the LIDAR point cloud 312.

Generally speaking, the LIDAR point cloud 312 is a set of LIDAR points in the form of a 3D point cloud, where a given LIDAR point 314 is a point in 3D space indicative of at least a portion of a surface of a given object on the road 302. In some embodiments of the present technology, the LIDAR point cloud 312 may be organized in layers, where points in each layer are also organized in an elliptical fashion and the starting points of all elliptical layers are considered to share a similar orientation.

The given LIDAR point 314 in the LIDAR point cloud 312 is associated with LIDAR parameters 316. As a non-limiting example, the LIDAR parameters 316 may include: distance, intensity, and angle, as well as other parameters relating to information that may be acquired by a second sensor 240. In some non-limiting embodiments of the present technology, the LIDAR parameters 316 may further include a geometric pattern of the plurality of lasers used by the second sensor 240 (i.e. how the lasers a positioned relative to each other, relative to the plane of the Earth, and the like).

The electronic device 210 is further configured to analyze the received LIDAR point cloud 312 and the LIDAR parameters 316 to generate a current pattern of the LIDAR points, depicted in FIG. 6 at 640. Broadly speaking, the current pattern of the LIDAR points 640 is representative of what the second sensor 240 currently "sees" in terms of the LIDAR point cloud data (i.e. which ones of the laser beams have been reflected, from which distance, and the like—i.e. information derivable from the LIDAR parameters 316 associated with each given LIDAR point 314 of the LIDAR point cloud 312).

Thus, it can said that the current pattern of the LIDAR points 640 is representative of a response pattern of the plurality of lasers used by the second sensor 240 which in turn is indicative of a totality of responses that the LIDAR should receive in response to emitting light by the plurality of lasers.

Step 606—Retrieving a Grid Representation Data of a Surrounding Area of the Vehicle As was depicted and described with reference to FIG. 4, the electronic device 210 is configured to execute the grid representation data acquisition procedure 400 for receiving the grid representation data 402 of the surrounding area 250 around the vehicle 220. The grid representation data 402 is associated with the vehicle 220. In some non-limiting embodiments of the present technology, the grid representation data 402 is centered on the vehicle 220 and moves with the vehicle 220 as the vehicle 220 moves along the road 302. Put another way, the process 400 can be executed as the vehicle 220 moves in order to obtain a then current version of the grid representation data 402.

It should be recalled that in some non-limiting embodiments of the present technology, the grid representation data 402 comprises an occupancy grid. Broadly speaking, the occupancy grid is a discretization of a road environment data into fixed-sized cells, each of which contains an indication of a probability the given cell is occupied. The occupancy grid is a basic data structure that is used as an alternative to storing full point clouds, for example.

Step 608—Based on the Current Pattern and the Grid Representation Data, Determining if the First Plurality of LIDAR Points is Associated with a Blind Spot, the Blind Spot Preventing the Detection Algorithm to Detect the Presence of at Least One Object Surrounding the Vehicle Conditioned on the at Least One Object Being Present The electronic device 210, utilizing the MLA 602 is configured to render a prediction 660, based on the current pattern and the grid representation data, the prediction 660 indicative of whether first plurality of LIDAR points is associated with a blind spot, the blind spot preventing the detection algorithm (executed as the detection process 500 described above) to detect the presence of at least one object surrounding the vehicle 220 conditioned on the at least one object being present.

Training Phase—Collection of a Training Set

Figure 7:
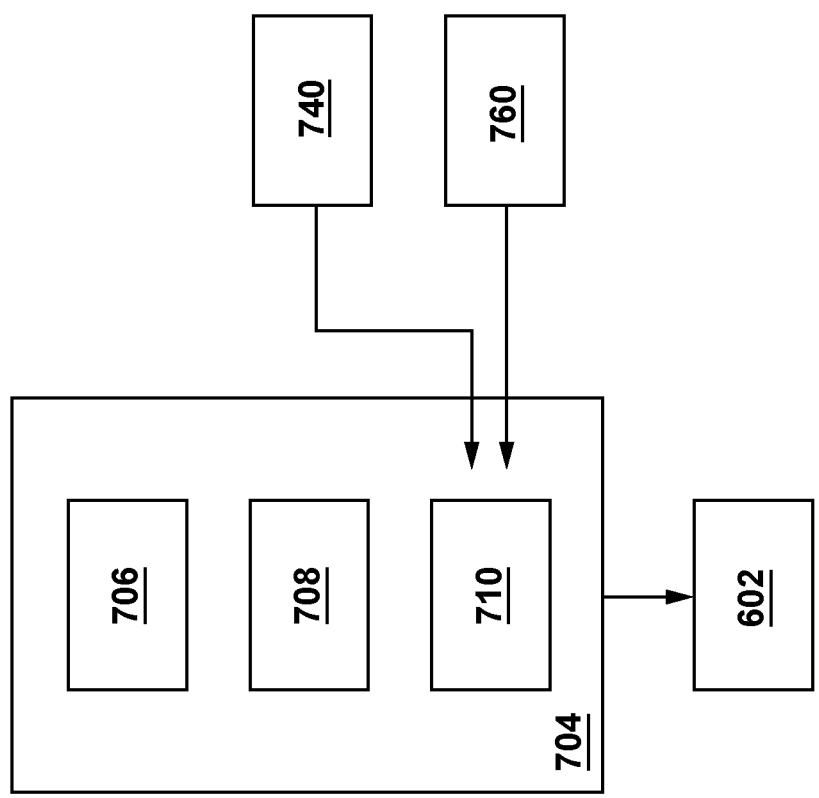
FIG. 7 depicts a training process for training the MLA of FIG. 6.

Now, we will turn our attention to how the MLA 602 is trained. With reference to FIG. 7, there is schematically depicted a training process 702. The training process 702 comprises acquiring a training set 704, the training set 704 including plurality of training set objects, each of the plurality of training set objects including:

a training pattern of the LIDAR points 706;

a training grid representation 708 data of an associated surrounding training area; and a label 710 indicative of whether the detection algorithm is able to detect the presence of at least one training object surrounding the vehicle conditioned on the at least one training object being present.

The training pattern of the LIDAR points 706 and the training grid representation 708 data can be captured by the aforementioned LIDAR data acquisition procedure 300 and grid representation data acquisition procedure 400, respectively, during a given point in time (referred to herein below as a training point of time). The electronic device 210 generates, for the training point of time, the label 710—the label 710 being indicative of whether the detection algorithm (implemented as the detection process 500) is able to detect the presence of at least one training object surrounding the vehicle conditioned on the at least one training object being present.

Now, in order to generate the label 710, the electronic device 210 needs two inputs: an indication of the presence of the at least one training object surrounding the vehicle 220 (depicted at 740) and an indication of whether the detection process 500 can predict the presence of the at least one training object surrounding the vehicle 220 (depicted at 750).

In order to generate the indication of whether the detection process 500 can predict the presence of the at least one training object surrounding the vehicle 220 (depicted at 750), the electronic device 210 feeds the training pattern of the LIDAR points 706 to the detection process 500 to render the prediction 506.

In order to generate the indication of the presence of the at least one training object surrounding the vehicle 220 (depicted at 740), the electronic device 210 can analyze the image of the surrounding area 250 captured by the first sensor 230 and/or the image of the surrounding area 250 captured by the first sensor 230 of another vehicle looking at the surrounding area 250 from a different vantage point.

The use of the image of the surrounding area 250 captured by the first sensor 230 of another vehicle looking at the surrounding area 250 from the different vantage point may be advantageous, as the other vehicle may be able to "see" presence of an object in the surrounding area 250 that may not be visible to the vehicle 220 as it may be in fact located in the blind spot of the second sensor 240 and, thus, be undetectable by the detection process 500.

In alternative non-limiting embodiments of the present technology, the electronic device 210 can analyze the image of the surrounding area 250 captured by the first sensor 230 at a previous point in time, together with a movement trajectory associated with the object present therein. The electronic device 210 can thus determine, if based on the presence of the other object in the previous view and its movement trajectory, if the same object should be visible in the present moment in time. In other words, the analyzing presence of at least one training object can be based on determining that based on the movement trajectory and a time difference between a training time and the time prior, the at least one training object should still be visible in the LIDAR point cloud 312.

Thus, by analyzing the indication of the presence of the at least one training object surrounding the vehicle 220 (depicted at 740) and the indication of whether the detection process 500 can predict the presence of the at least one training object surrounding the vehicle 220 (depicted at 750), the electronic device 210 is configured to generate the label 710, which is indicative of whether or not the detection process 500 is configured to actually detect the presence of the object (based on the indication of whether the detection process 500 can predict the presence of the at least one training object surrounding the vehicle 220 (depicted at 750)), provided that such object indeed exists (based on the indication of the presence of the at least one training object surrounding the vehicle 220 (depicted at 740)).

In order to generate such an analysis, the electronic device 210 is configured to execute a secondary algorithm, whether the at least one training object is present. The secondary algorithm can be implemented as a heuristic based algorithm. Alternatively, the electronic device 210 can receive the indication of the presence of the at least one training object from an operator of the electronic device 210.

Thus, if the object actually exists (based on the indication of the presence of the at least one training object surrounding the vehicle 220 (depicted at 740)), while the detection process 500 is not being able to detect the presence thereof (based on the indication of whether the detection process 500 can predict the presence of the at least one training object surrounding the vehicle 220 (depicted at 750)), the label 710 is indicative of the presence of the blind spot in the LIDAR point cloud 312.

Thus, such the training set 704 is configured to train the MLA 602 to correlate the current pattern of the LIDAR point cloud 312 to the presence of the blind spots in the LIDAR point cloud 312.

In-Use Application of the Detection of the Blind Spot

As has been described above, the electronic device 210, utilizing the MLA 602, is configured to render the prediction 660, based on the current pattern and the grid representation data, the prediction 660 indicative of whether first plurality of LIDAR points of the LIDAR point cloud 312 is associated with a blind spot, the blind spot preventing the detection algorithm (executed as the detection process 500 described above) to detect the presence of at least one object surrounding the vehicle 220 conditioned on the at least one object being present.

Based on the prediction 660, which may be associated with a binary indication of the presence of the blind spot (or absence thereof) or a weighted indication (i.e. indicative of the strength of the prediction) of whether or not the blind spot is present, the electronic device 210 is configured to generate one or more remedial actions associated with the vehicle 220.

For example, in response to the detection of the blind spot in the first plurality of LIDAR points, the electronic device 210 may be configured to control the vehicle 220 to apply at least one remedial action. The at least one remedial action can comprise obtaining additional sensor data from at least one additional sensor associated with the vehicle 220 in an attempt to correct the blind spot. For example, the electronic device 210 may obtain image data from the first sensor 230 or other sensors present on the vehicle 220 to supplement the prediction 506 made solely based on data available from the second sensor 240 (or data from the second sensor 240 enriched with data from another sensor, such as the first sensor 230).

In alternative non-limiting embodiments of the present technology, the at least one remedial action may comprise controlling the vehicle 220 to augment vehicle movement (such as change the trajectory, or the like). More specifically, augmentation of the vehicle movement can comprise causing the vehicle 220 one of: to slow down, to change trajectory, to execute emergency braking and to accelerate.

Figure 8:
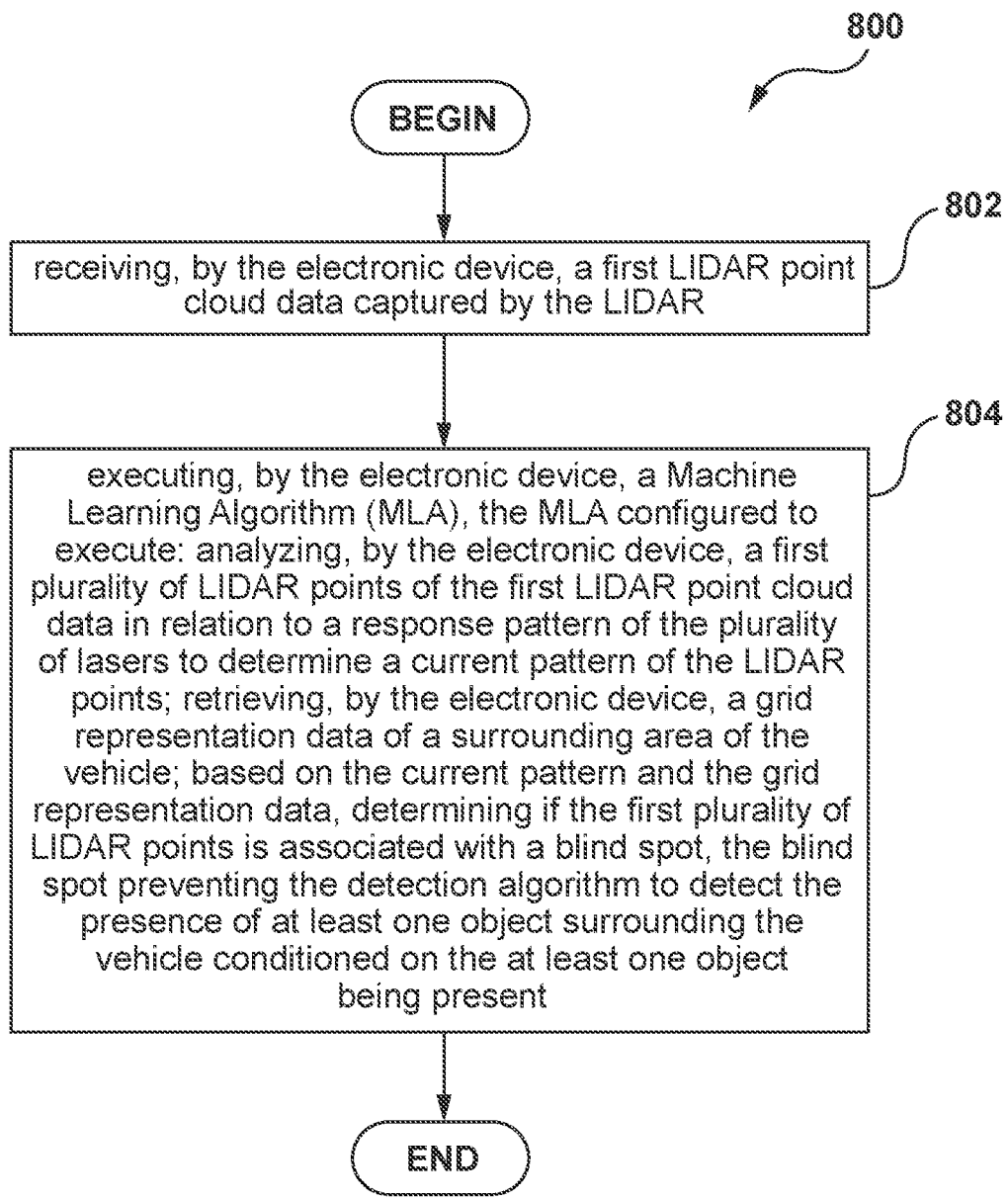
FIG. 8 depicts a flow chart of a method, the method executable in the networked computing environment of FIG. 2, in accordance with the non-limiting embodiments of the present technology.

Description of Non-Limiting Embodiments of a Method for Processing LIDAR Data Given the architecture and examples provided hereinabove, it is possible to execute a computer-implemented method of processing Light Detection and Ranging (LIDAR) point cloud data. The method can be executable by the electronic device 210. With reference to FIG. 8, there is depicted a flow chart of a method 800, the method 800 being executable in accordance with non-limiting embodiments of the present technology. It is noted that in accordance with the non-limiting embodiments of the present technology, the method 800 can be useful for detecting blind spots associated with the second sensor 240 and the captured current 3-D point cloud data of the surrounding area 250.

Step 802—Receiving, by the Electronic Device, a First LIDAR Point Cloud Data Captured by the LIDAR The method 800 begins at stem 802, where the electronic device executes receiving a first LIDAR point cloud data captured by the LIDAR (i.e. the second sensor 240). This process can be executed as described above with reference to the LIDAR data acquisition procedure 300.

Step 804—Executing, by the Electronic Device, a Machine Learning Algorithm (MLA), the MLA Configured to Execute: Analyzing, by the Electronic Device, the First Plurality of LIDAR Points of the First LIDAR Point Cloud Data in Relation to a Response Pattern of the Plurality of Lasers to Determine a Current Pattern of the LIDAR Points; Retrieving, by the Electronic Device, a Grid Representation Data of a Surrounding Area of the Vehicle; Based on the Current Pattern and the Grid Representation Data, Determining if the First Plurality of LIDAR Points is Associated with a Blind Spot, the Blind Spot Preventing the Detection Algorithm to Detect the Presence of at Least One Object Surrounding the Vehicle Conditioned on the at Least One Object Being Present At step 804, the electronic device 210 executes the MLA 602. The MLA 602 is configured to execute: analyzing the first plurality of LIDAR points of the first LIDAR point cloud data in relation to a response pattern of the plurality of lasers to determine a current pattern of the LIDAR points; retrieving the grid representation data 402 of the surrounding area 250 of the vehicle 220; based on the current pattern and the grid representation data 402, determining if the first plurality of LIDAR points is associated with a blind spot, the blind spot preventing the detection algorithm (i.e. the detection process 500) to detect the presence of at least one object surrounding the vehicle conditioned on the at least one object being present.

In some implementations of the method 800, the method 800 further comprises training the MLA. Training of the MLA 602 was described above, in detail, with reference to FIG. 7 (training process 702). To recap, the training process 702 can include: feeding the MLA with a plurality of training set objects, each of the plurality of training set objects including: a training pattern of the LIDAR points; a training grid representation data of an associated surrounding training area; a label indicative of whether the detection algorithm is able to detect the presence of at least one training object surrounding the vehicle conditioned on the at least one training object being present.

In some implementations of the method 800, the method 800 further comprises determining, by a secondary algorithm, whether the at least one training object is present.

In order to generate the indication of the presence of the at least one training object surrounding the vehicle 220 (depicted at 740), the electronic device 210 can analyze the image of the surrounding area 250 captured by the first sensor 230 and/or the image of the surrounding area 250 captured by the first sensor 230 of another vehicle looking at the surrounding area 250 from a different vantage point.

The use of the image of the surrounding area 250 captured by the first sensor 230 of another vehicle looking at the surrounding area 250 from the different vantage point may be advantageous, as the other vehicle may be able to "see" presence of an object in the surrounding area 250 that may not be visible to the vehicle 220 as it may be in fact located in the blind spot of the second sensor 240 and, thus, be undetectable by the detection process 500.

In alternative non-limiting embodiments of the present technology, the electronic device 210 can analyze the image of the surrounding area 250 captured by the first sensor 230 at a previous point in time, together with a movement trajectory associated with the object present therein. The electronic device 210 can thus determine, if based on the presence of the other object in the previous view and its movement trajectory, if the same object should be visible in the present moment in time. In other words, the analyzing presence of at least one training object can be based on determining that based on the movement trajectory and a time difference between a training time and the time prior, the at least one training object should still be visible in the LIDAR point cloud 312.

Thus, by analyzing the indication of the presence of the at least one training object surrounding the vehicle 220 (depicted at 740) and the indication of whether the detection process 500 can predict the presence of the at least one training object surrounding the vehicle 220 (depicted at 750), the electronic device 210 is configured to generate the label 710, which is indicative of whether or not the detection process 500 is configured to actually detect the presence of the object (based on the indication of whether the detection process 500 can predict the presence of the at least one training object surrounding the vehicle 220 (depicted at 750)), provided that such object indeed exists (based on the indication of the presence of the at least one training object surrounding the vehicle 220 (depicted at 740)).

In order to generate such an analysis, the electronic device 210 is configured to execute a secondary algorithm, whether the at least one training object is present. The secondary algorithm can be implemented as a heuristic based algorithm. Alternatively, the electronic device 210 can receive the indication of the presence of the at least one training object from an operator of the electronic device 210.

In some non-limiting embodiments of the method 800, the method 800 further comprises in response to the detection of the blind spot in the first plurality of LIDAR points, controlling the vehicle 220 to apply at least one remedial action. The at least one remedial action can include obtaining additional sensor data from at least one additional sensor associated with the vehicle 220 in an attempt to correct the blind spot. For example, the electronic device 210 can trigger the first sensor 230 to capture and provide image data for further analysis by the electronic device 210.

In alternative non-limiting embodiments of the method 800, the at least one remedial action comprises controlling the vehicle 220 to augment vehicle movement. As an example, controlling the vehicle 220 to augment vehicle movement comprises causing the vehicle one of: to slow down, to change trajectory, to execute emergency braking and to accelerate.

In some non-limiting embodiments of the method 800, the determining if the first plurality of LIDAR points is associated with the blind spot is further based on a geometric pattern of the plurality of lasers. For example, the electronic device 210 can receive an indication of a vertical scanning height of the second sensor 240. In some non-limiting embodiments of the present technology, the electronic device 210 can receive an indication of spatial positioning of lasers that make up the second sensor 240. In these non-limiting embodiments of the present technology, the electronic device 210 can use this additional information as a feature for the MLA 602 or as an additional aid in determining if the blind spot is present (for example, to filter out areas that are above visibility of the second sensor 240).

In some non-limiting embodiments of the method 800, the response pattern of the plurality of lasers is indicative of a totality of response that the LIDAR should receive in response to emitting light by the plurality of lasers.

Modifications and improvements to the above-described implementations of the present technology may become apparent to those skilled in the art. The foregoing description is intended to be exemplary rather than limiting. The scope of the present technology is therefore intended to be limited solely by the scope of the appended claims.

What is claimed is:

1. A method of processing Light Detection and Ranging (LIDAR) point cloud data, the method executable by an electronic device, communicatively coupled to a LIDAR installed on a vehicle, the LIDAR having a plurality of lasers and configured for capturing LIDAR point cloud data having a plurality of LIDAR points, the electronic device further executing a detection algorithm for detecting presence of at least one object surrounding the vehicle based on the LIDAR point cloud data, the method comprising:
 receiving, by the electronic device, a first LIDAR point cloud data captured by the LIDAR;
 executing, by the electronic device, a Machine Learning Algorithm (MLA), the MLA having been trained by:
  feeding the MLA with a plurality of training set objects, each of the plurality of training set objects including:
   a training pattern of the LIDAR points;
   a training grid representation data of an associated surrounding training area; and
   a label indicative of whether the detection algorithm is able to detect the presence of at least one training object surrounding the vehicle conditioned on the at least one training object being present;
 the MLA being configured to execute:
  analyzing, by the electronic device, a first plurality of LIDAR points of the first LIDAR point cloud data in relation to a response pattern of the plurality of lasers to determine a current pattern of the LIDAR points;
  retrieving, by the electronic device, a grid representation data of a surrounding area of the vehicle;
  based on the current pattern and the grid representation data, determining if the first plurality of LIDAR points is associated with a blind spot, the blind spot preventing the detection algorithm to detect the presence of at least one object surrounding the vehicle conditioned on the at least one object being present.

2. The method of claim 1, wherein the method further comprises determining, by a secondary algorithm, whether the at least one training object is present.

3. The method of claim 2, wherein the secondary algorithm comprises analyzing image data captured by one of the vehicle and another vehicles, the image data indicative of the at least one training object being present.

4. The method of claim 2, wherein the secondary algorithm comprises analyzing presence of at least one training object at a time prior to executing the training and a movement trajectory associated therewith.

5. The method of claim 4, wherein the analyzing presence of at least one training object further comprises determining that based on the movement trajectory and a time difference between a training time and the time prior, the at least one training object should still be visible in the LIDAR points.

6. The method of claim 1, wherein in response to the detection of the blind spot in the first plurality of LIDAR points, the method further comprises controlling the vehicle to apply at least one remedial action.

7. The method of claim 6, wherein the at least one remedial action comprises obtaining additional sensor data from at least one additional sensor associated with the vehicle in an attempt to correct the blind spot.

8. The method of claim 6, wherein the at least one remedial action comprises controlling the vehicle to augment vehicle movement.

9. The method of claim 8, wherein controlling the vehicle to augment vehicle movement comprises causing the vehicle one of: to slow down, to change trajectory, to execute emergency braking and to accelerate.

10. The method of claim 1, wherein the determining if the first plurality of LIDAR points is associated with the blind spot is further based on a geometric pattern of the plurality of lasers.

11. The method of claim 1, wherein the response pattern of the plurality of lasers is indicative of a totality of response that the LIDAR should receive in response to emitting light by the plurality of lasers.

12. The method of claim 1, wherein the grid representation data is representative of a grid with a center point located at the vehicle.

13. The method of claim 12, wherein the grid moves with a movement of the vehicle.

14. The method of claim 1, wherein the method further comprises generating the grid representation data as an occupancy grid.

15. A system comprising:
 an electronic device,
 a LIDAR communicatively coupled to the electronic device, the LIDAR having a plurality of lasers and configured for capturing LIDAR point cloud data having a plurality of LIDAR points,
 the electronic device configured to execute a detection algorithm for detecting presence of at least one object in a surrounding area based on the LIDAR point cloud data,
 the electronic device configured to:
  receive a first LIDAR point cloud data captured by the LIDAR;
  execute a Machine Learning Algorithm (MLA), the MLA having been trained by:
  feeding the MLA with a plurality of training set objects, each of the plurality of training set objects including:
   a training pattern of the LIDAR points;
   a training grid representation data of an associated surrounding training area; and
   a label indicative of whether the detection algorithm is able to detect the presence of at least one training object surrounding the vehicle conditioned on the at least one training object being present;
  the MLA being configured to execute:
   analyzing, by the electronic device, a first plurality of LIDAR points of the first LIDAR point cloud data in relation to a response pattern of the plurality of lasers to determine a current pattern of the LIDAR points;
   retrieving, by the electronic device, a grid representation data of the surrounding area;
   based on the current pattern and the grid representation data, determining if the first plurality of LIDAR points is associated with a blind spot, the blind spot preventing the detection algorithm to detect the presence of at least one object in the surrounding area conditioned on the at least one object being present.

16. The system of claim 15, wherein the LIDAR is associated with a vehicle.

17. The system of claim 15, wherein the LIDAR and the electronic device are mounted on a vehicle.

18. The system of claim 15, wherein the detection algorithm is a first MLA different from the MLA.

19. The system of claim 15, wherein the electronic device is at least one of a local electronic device, a server remotely coupled to the vehicle, and a sub-system of the local electronic device and the server.

* * * * *